United States Patent Office 2,828,987
Patented Apr. 1, 1958

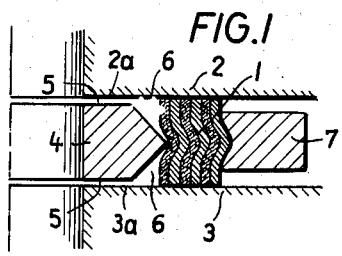
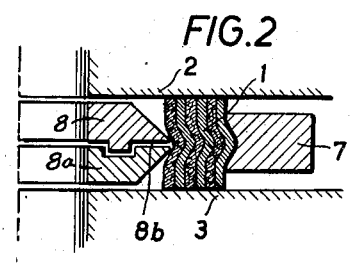
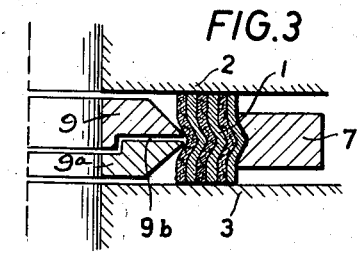
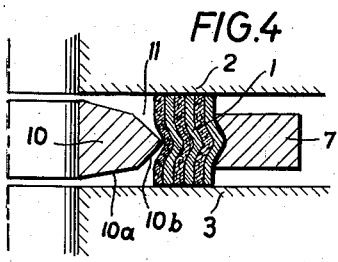
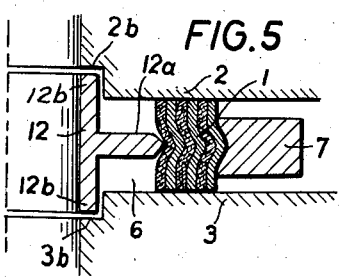
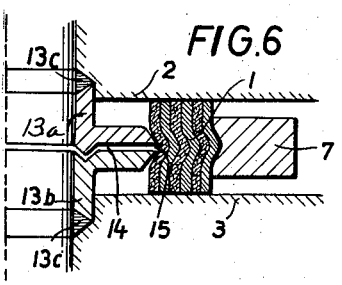

2,828,987

PRESSURE SEALS FOR PIPE FLANGES

Friedrich Schmitz, Koln-Sulz, Germany

Application February 3, 1955, Serial No. 486,007

5 Claims. (Cl. 288—20)

This invention relates to gasket devices or seals against high pressures between pipe flanges.

For providing a seal for flange parts of pipe lines subjected to high internal pressure, it has already been proposed to use packings which are formed as flat spirals by spirally winding a metal strip, disposed edgewise, with a strip of packing material e. g. asbestos or asbestos-rubber mixture, the ends of the metal strip being fixed by spot welding. The packing is held in position by an outer centering ring, the said ring being of slightly less height than the packing in order to prevent the latter from being compressed excessively. The packing is arranged between the flange parts in such a manner that the vertical parts of the innermost turn of the inner winding contact the flange surfaces facing the axis of the pipe. However, the groove in which the packing lies, between the flange parts, impairs the smooth passage of the pressure medium and causes the formation of harmful eddies.

According to the present invention, there is provided a packing device or seal against high pressures between pipe flanges, wherein a packing member is provided consisting of a strip of metal wound together with a strip of packing material, to form a flat spiral, and wherein a centering ring is arranged within the spiral, such ring having an internal diameter corresponding to the internal diameter of the pipe flanges with which the device is intended to be used, and having an external surface which is substantially wedge-shaped in cross-section, said spiral having an inner surface, possessing a substantially angular concavity in cross-section, for co-operation with said wedge-shaped surface, the apex of the wedge-shaped portion of the centering ring being smaller than the angle of the concavity of the packing member.

It is possible to provide labyrinth gaps which extend in the radial direction between the centering ring and the flange surfaces.

Owing to the fact that the centering ring has its inner wall flush with the inner wall of the pipe line, the packing provides a smoother passage for the pressure medium and effectively prevents the formation of eddies or of dead spaces. Since the ring is formed at its side facing the packing with a surface which is substantially wedge-shaped in cross-section and the angle at the apex of the wedge-shaped portion of the centering ring being smaller than the angle of the substantially angular concavity of the spiral, a free space is provided in which the medium can experience a pressure release. The medium can pass into this free space through the labyrinth gaps which extend radially between the ring and the flange surfaces. The packing element proper is substantially protected and relieved of the pressure medium load by this arrangement. Only slight pressure forces are required at the flanges and a satisfactory sealing effect is achieved even with high internal pressure.

The centering ring may be divided along the central plane and the gap may be angled one or more times. The first pressure effect is in this case directed, less against the packing surfaces on the spiral asbestos packing, than against the surface of the centering ring, through which the pressure effect cannot be transmitted. The pressure medium is more or less diverted on its way to the packing by being forced to pursue a tortuous or labyrinthic path, whereby the composite packing material is effectively relieved of the direct and high pressure of the pressure medium flowing through the flanged pipes proper. In this connection, care should be taken that the centering ring does not receive any flank pressure by the flanges being drawn together.

In a further constructional form the centering ring is T-shaped. The free ends of the arms of the T engage in recesses of the flange parts. Moreover, the T-shaped ring can be divided in its middle plane in order to cause the pressure medium to travel along the longest possible labyrinth path before reaching the sealing surfaces. In this case the parts of the centering ring can each be connected to the flanges.

For a better understanding of the invention, and to show how the same may be carried into effect, reference will now be made to the accompanying drawings in which:

Fig. 1 is a fragmentary longitudinal sectional view of one side of connected pipes, showing the adjacent pipe flanges with a packing or seal between the flanges and illustrating one form of centering ring for the packing or seal, and Figs. 2 to 6 show similar cross-sectional views with different forms of centering rings.

Referring now to Fig. 1 of the drawings, there is shown a spiral composite metal and asbestos packing 1 which is pressed in between end flanges 2 and 3 of aligned pipes and held thereby in known manner. The packing 1 or seal comprises a metal strip wound together edgewise with the packing material strip to form a flat spiral like a clock spring. In order to relieve the packing element itself of load, there is situated on the inner side of the packing an inner centering ring 4 which is adapted to bear against the packing element. This centering ring 4 is so constructed that the inner surface thereof lies flush with the inner walls of aligned pipes, thus providing a smooth passage for the pressure medium. The centering ring is so dimensioned that gaps 5 which should be as small as possible remain between the ring and flange parts 2a and 3a. At the side facing the packing element 1 the peripheral surface of the ring is substantially wedge-shaped in cross-section. The inner surface of the spiral has a substantially angular concavity in cross-section which co-operates with the wedge-shaped surface of the ring. The angle of the apex of the wedge-shaped portion of the centering ring is smaller than the angle of the concavity. Thus, for a leak to occur, the pressure medium must first of all pass through the gaps 5 which act as pressure-reducing gaps, and then pass into pressure-release spaces 6. Both the gaps 5 and the spaces 6 together lengthen the labyrinth path which the pressure medium has to follow from the inside of the pipe line towards the exterior; also the sealing action is obtained by the packing element with respect to the flange surfaces 2a and 3a, as the packing element effectively constitutes a labyrinth packing. The usual support rim for the outer side of the spiral asbestos packing is indicated by the reference character 7.

In the modification shown in Fig. 2, the centering ring is formed of two parts 8 and 8a with a tongue and groove connection intermediate the inner and outer edges thereof, thus forming a central tortuous gap 8b which follows an angular course in order to increase the labyrinth effect.

Fig. 3 illustrates a modified constructional form of a centering ring divided into two parts or segments 9 and 9a with an interfitting connection between the parts at the inner side thereof and providing a tortuous path 9b.

Fig. 4 shows a centering ring wherein the gap at the inner side of the ring 10 between the flange surfaces and the centering ring is small. The opposite sides of the ring 10 are angled as at 10a and 10b to provide a relatively large release space 11 adjoining the ring and packing or seal 1.

The centering ring in itself can be of any desired cross-section. The height of the ring should be so chosen that when the flanges are de-tensioned they do not bear directly on the centering ring but a certain labyrinth gap remains. On the other hand, the gap must not be too great since otherwise the labyrinth effect would not be achieved. Furthermore, it is desirable that the centering ring lie flush with the inner side of the pipe line or the like so as to allow a smooth passage for the pressure medium. Eddy formation and flow losses are thereby avoided.

Fig. 5 illustrates a modification having a T-shaped centering ring 12 whose central leg 12a bears against the middle of the packing or sealing element 1. The two other arms 12b project into recesses 2b and 3b in the flange parts 2 and 3, respectively. In this case also a smooth passage for the pressure medium is ensured. The gaps at the recesses 2b and 3b are fashioned as labyrinth gap. The pressure medium then reaches a large pressure release space 6 before impinging directly on the packing element.

As shown in Fig. 6, the T-shaped centering ring can also be divided in its middle plane so as to form two angle elements 13a and 13b which can in turn be connected fixedly as by welding at 13c to the flanges 2 and 3 respectively. A labyrinth gap 14 is formed between the elements 13a and 13b with a pressure release space 15 in the middle of the packing element 1.

The centering ring can be produced from any suitable materials such as steel, copper, brass or the like.

What is claimed is:

1. In a gasket device of the type described for use in sealing adjacent pipe flanges in a ring type pipe joint, the combination of a packing member comprised of a spirally wound flat strip of composite material, a support rim in contact with the outer periphery of said packing member and an annular centering ring arranged concentrically within and contacting the inner periphery of said packing member, the portion of said centering ring in contact with said packing member also being wedge-shaped in cross-section, said packing member in turn having an annular concavity angular in cross-section for reception of the apex of said wedge-shaped portion of said centering ring, said apex forming the sole contact between the centering ring and the packing member, and said apex of said wedge-shaped portion of the centering ring being smaller than the angle of the concavity in the packing member.

2. In a gasket device of the type described for use in sealing adjacent pipe flanges in a ring type pipe joint, the combination of a packing member comprised of a spirally wound flat strip of composite material, a supporting rim in contact with the outer periphery of said packing member and an annular centering ring arranged concentrically within and contacting the inner periphery of said packing member, the portion of said centering ring in contact with said packing member being wedge-shaped in cross-section, said packing member in turn having an annular concavity angular in cross-section for reception of the apex of the said wedge-shaped portion of said centering ring, said apex forming the sole contact between the centering ring and the packing member, said apex of said wedge-shaped portion of the centering ring being smaller than the angle of the concavity in the packing member, and said centering ring in turn also being comprised of annular segments having irregular cooperating and mating surfaces providing a radial tortuous fluid passage therebetween.

3. In a gasket device of the type described for use in sealing adjacent pipe flanges in a ring type pipe joint, the combination of a packing member comprised of a spirally wound flat strip of composite material, a supporting rim in contact with the outer periphery of said packing member and an annular centering ring arranged concentrically within and contacting the inner periphery of said packing member, the portion of said centering ring in contact with said packing member being wedge-shaped in cross-section, said packing member in turn having an annular concavity angular in cross-section for reception of the apex of the said wedge-shaped portion of said centering ring, said apex forming the sole contact between the centering ring and the packing member, said apex of said wedge-shaped portion of the centering ring being smaller than the angle of the concavity in the packing member, said centering ring also having a radially outwardly tapering main body portion which merges with said wedge-shaped portion thereby being adapted to provide a relatively small space between each side of the main body portion of the ring and the portions of the pipe flanges immediately adjacent thereto and a larger pressure release space between each side of the wedge-shaped portion of the ring and the portions of the pipe flanges immediately adjacent said sides of the wedge-shaped portion of the ring.

4. A gasket device as set forth in claim 1, wherein the centering ring is generally T-shaped in cross-section, with the wedge-shaped portion of the centering ring comprising the free end of the stem of the T.

5. The combination as set forth in claim 4, wherein said T-shaped centering ring is comprised of a pair of mating annular segments having irregular mating surfaces providing a radial, tortuous and fluid passage therebetween.

References Cited in the file of this patent

UNITED STATES PATENTS

| | | |
|---|---|---|
| 2,027,299 | Bohmer et al. | Jan. 7, 1936 |
| 2,442,312 | Price | May 25, 1948 |